United States Patent
Heydari

(10) Patent No.: US 10,554,683 B1
(45) Date of Patent: Feb. 4, 2020

(54) SYSTEMS AND METHODS FOR PREVENTING REMOTE ATTACKS AGAINST TRANSPORTATION SYSTEMS

(71) Applicant: Vahid Heydari, Huntsville, AL (US)

(72) Inventor: Vahid Heydari, Huntsville, AL (US)

(73) Assignee: Board of Trustees of the University of Alabama, for and on behalf of the University of Alabama in Huntsville, Huntsville, AL (US)

( * ) Notice: Subject to any disclaimer, the term of this patent is extended or adjusted under 35 U.S.C. 154(b) by 82 days.

(21) Appl. No.: 15/461,099

(22) Filed: Mar. 16, 2017

Related U.S. Application Data

(60) Provisional application No. 62/338,665, filed on May 19, 2016.

(51) Int. Cl.
*H04L 29/06* (2006.01)
*H04W 12/10* (2009.01)

(52) U.S. Cl.
CPC ......... *H04L 63/1441* (2013.01); *H04W 12/10* (2013.01)

(58) Field of Classification Search
CPC ............................ H04L 63/1441; H04W 12/10
USPC .......................................................... 726/22
See application file for complete search history.

(56) References Cited

U.S. PATENT DOCUMENTS

| | | | |
|---|---|---|---|
| 7,142,971 B2 | 11/2006 | Brown et al. | |
| 7,152,238 B1 * | 12/2006 | Leung | H04L 63/0281 |
| | | | 726/2 |
| 2003/0016655 A1 * | 1/2003 | Gwon | H04L 45/00 |
| | | | 370/352 |
| 2004/0008845 A1 * | 1/2004 | Le | H04L 29/12009 |
| | | | 380/277 |
| 2005/0008032 A1 * | 1/2005 | Yamamoto | H04W 80/045 |
| | | | 370/466 |

(Continued)

OTHER PUBLICATIONS

Lum, et al., "Teleoperation of a Surgical Robot Via Airborne Wireless Radio and Transatlantic Internet Links," Berlin, Heidelberg: Springer Berlin Heidelberg, pp. 305-314, 2008.

(Continued)

*Primary Examiner* — Michael S McNally
(74) *Attorney, Agent, or Firm* — Maynard Cooper & Gale, P.C.; Jon E. Holland

(57) ABSTRACT

Systems and methods are provided to implement moving target defense techniques for transportation systems. The moving target defense techniques can randomly change the IP addresses of the nodes associated with both the vehicles and the corresponding control centers. The nodes for the vehicles and the control centers can be "mobile" nodes that use a "care-of" IP address for communications. The care-of address used by the nodes can be updated through a binding update process. During the binding update process, the one node sends the binding update notice (with a new care-of address) to the care-of address of the other node while maintaining its prior care-of address. The node that receives the binding update notice can send a binding acknowledgement back to the node that sent the binding update. Once the binding acknowledgement is received, the prior care-of address can be removed by the node that sent the binding update.

19 Claims, 5 Drawing Sheets

(56) References Cited

U.S. PATENT DOCUMENTS

| | | | | | |
|---|---|---|---|---|---|
| 2007/0214501 | A1* | 9/2007 | Muramoto | .......... | H04L 63/0236 726/11 |
| 2008/0043739 | A1* | 2/2008 | Suh | ...................... | H04W 8/082 370/392 |
| 2009/0257401 | A1* | 10/2009 | Hirano | .............. | H04W 36/0011 370/331 |
| 2013/0212249 | A1 | 8/2013 | Groat et al. | | |

OTHER PUBLICATIONS

Manadhata, et al., "An attack surface metric," IEEE Transactions on Software Engineering, vol. 37, No. 3, pp. 371-386, May 2011.
Stavrou, et al., "Move: An end-to-end solution to network denial of service," Proceedings of the Internet Society (ISOC) Symposium on Network and Distributed Systems Security (SNDSS), pp. 1-16, Feb. 2005.
Wang, et al., "A moving target DDOS defense mechanism," Computer Communications, vol. 46, pp. 10-21, 2014.
Wang, et al., "Catch me if you can: A cloud-enabled ddos defense," IEEE/IFIP Dependable Systems and Networks, pp. 264-275, 2014.
Danev, et al., "Enabling secure vm-vtpm migration in private clouds," in Proceedings of the 27th Annual Computer Security Applications Conference, pp. 187-196, 2011.
Zhang, et al., "Incentive Compatible Moving Target Defense against VM-Colocation Attacks in Clouds," Berlin, Heidelberg: Springer Berlin Heidelberg, pp. 388-399, 2012.
Okhravi, et al., "Creating a cyber moving target for critical infrastructure applications using platform diversity," International Journal of Critical Infrastructure Protection, vol. 5, No. 1, pp. 30-39, 2012.
Hong, et al., "Assessing the effectiveness of moving target defenses using security models," IEEE Transactions on Dependable and Secure Computing, vol. 13, No. 2, pp. 163-177, Mar. 2016.
Dunlop, et al., "Mt6d: A moving target ipv6 defense," AFCEA/IEEE MILCOM, pp. 1321-1326, 2011.
Morrell, et al., "Scaling ipv6 address bindings in support of a moving target defense," Internet Technology and Secured Transactions (ICITST), pp. 440-445, 2014.
Mathiesen, "Access to information as a human right," SRRN, pp. 1-20, Sep. 2008.
Dingledine, et al., "Tor: The second generation onion router," USENIX Security Symposium, pp. 1-17, 2004.
Stavrou, et al., "Move: an end-to-end solution to network denial of service," pp. 1-16, 2005.
Winter, et al., "How the great firewall of china is blocking tor," 2nd USENIX Workshop on Free and Open Communications on the Internet, pp. 1-7, 2012.
Moghaddam, et al., "Skypemorph: Protocol obfuscation for tor bridges," ACM Conference on Computer and Communications Security, pp. 1-13, 2012.
Weinberg, et al., "Stegotorus: A camouflage proxy for the tor anonymity system," ACM Conference on Computer and Communications Security, pp. 109-120, 2012.
Houmansadr, et al., "The parrot is dead: Observing unobservable network communications," IEEE Symposium on Security and Privacy, 66. 65-79, 2013.
Karlin, et al., "Decoy routing: Toward unblockable internet communication," USENIX Workshop on Free and Open Communications on the Internet, pp. 1-6, 2011.
Houmansadr, et al., "Cirripede: Circumvention infrastructure using router redirection with plausible deniability," ACM Conf. on Computer and Comm. Security, pp. 1-13, 2011.
Wustrow, et al., "TapDance: End-to-middle anticensorship without flow blocking," USENIX Security Symposium, pp. 159-174, 2014.
Wustrow, et al., "Telex: Anticensorship in the network infrastructure," USENIX Conference on Security, pp. 1-15, 2011.
Schuchard, et al., "Routing around decoys," ACM Conf. on Computer and Comm. Security, pp. 1-12, 2012.
Heydari, et al., "Scalable Anti-Censorship Framework using Moving Target Defense for Web Servers," IEEE Transactions on Information Forensics and Security, vol. 12, No. 5, pp. 1113-1124, May 2017.
Heydari, et al., "Anti-Censorship Framework using Mobile IPv6 based Moving Target Defense," Proc. ACM 11th Annual Cyber and Information Security Research, pp. 1-8, 2016.
Heydari, et al., "Securing Critical Infrastructure by Moving Target Defense," 11th International Conference on Cyber Warfare and Security, pp. 382-390, 2016.
Heydari, et al., "Secure VPN Using Mobile IPv6 Based Moving Target Defense," 2016 IEEE Global Communications Conference (GLOBECOM), pp. 1-6, 2016.
H. Soliman, "Mobile IPv6," Addison-Wesley, pp. 1-4, 2004.
Perkins, et al., "Mobility support in ipv6," Internet Requests for Comments, RFC 6275, pp. 1-169, Jul. 2011.
Gil, et al., "Multops: A data-structure for bandwidth attack detection," Proceedings of the 10th Conference on USENIX Security Symposium, vol. 10, pp. 1-12, 2001.
Hussain, et al., "A framework for classifying denial of service attacks," Proceedings of the 2003 Conference on Applications, Technologies, Architectures, and Protocols for Computer Communications, pp. 99-110, 2003.
Jafarian, et al., "Openflow random host mutation: Transparent moving target defense using software defined networking," Proceedings of the First Workshop on Hot Topics in Software Defined Networks, pp. 127-132, 2012.
Kaufman, et al., "Internet key exchange protocol version 2 (ikev2)," Internet Requests for Comments, pp. 1-142, Oct. 2014.
Thomson, et al., "ipv6 stateless address autoconfiguration," Internet Requests for Comments, RFC 4862, pp. 1-30, Sep. 2007.
Johnson, et al., "Mobility support in ipv6," Internet Requests for Comments, RFC 3775, pp. 1-165, Jun. 2004.
C. Perkins, "Securing mobile ipv6 route optimization using a static shared key," Internet Requests for Comments, RFC 4449, pp. 1-7, Jun. 2006.
Nikander, et al., "Mobile ip version 6 route optimization security design background," Internet Requests for Comments, RFC 4225, pp. 1-37, Dec. 2005.
Narten, et al., "Neighbor discovery for ip version 6 (ipv6)," Internet Requests for Comments, RFC 4861, pp. 1-97, Sep. 2007.
Arkko, et al., "Enhanced route optimization for mobile ipv6," Internet Requests for Comments, RFC 4866, pp. 1-54, May 2007.
Wakikawa, et al., "Multiple care-of addresses registration," Internet Requests for Comments, RFC 5648, pp. 1-36, Oct. 2009.
Ebalard, "Mobile ipv6 ipsec route optimization (iro)," Working Draft, IETF Secretariat, Internet-Draft draft-ebalardmext-ipsec-ro-02, pp. 1-41, Jul. 2010, http://www.ietf.org/internet-drafts/draft-ebalard-mext-ipsec-ro-02.txt.
Zetter, "Hackers Could Commandeer New Planes Through Passenger Wi-Fi j WIRED," http://www.wired.com/2015/04/hackers-commandeer-new-planes-passenger-wi-fi/, pp. 1-6, May 28, 2006.
"Cisco asa software ikev1 and ikev2 buffer overflow vulnerability," http://tools.cisco.com/security/center/content/CiscoSecurityAdvisory/cisco-sa-20160210-asa-ike, pp. 1-3, Aug. 5, 2016.
"Scapy," http://www.secdev.org/projects/scapy/, pp. 1-3, Oct. 4, 2015.
"D-itg | distributed internet traffic generator," http://traffic.comics.unina.it/software/ITG/, p. 1, Mar. 24, 2016.
"F-secure j switch on freedom," https://www.f-secure.com/en_US/welcome, pp. 1-2, Oct. 4, 2015.
"Free VPN service j free VPN software—hotspot shield VPN," http://www.hotspotshield.com/, pp. 1-3, Oct. 4, 2015.
"Psiphon j uncensored internet access for windows and mobile," https://psiphon3.com/en/index.html, p. 1, Oct. 4, 2015.
Heydari, et al., U.S. Appl. No. 15/478,846, entitled, "Anti-Censorship Framework Using Moving Target Defense Systems and Methods," filed Apr. 4, 2017.
Heydari, et al., U.S. Appl. No. 15/600,178, entitled, "Moving Target Defense Systems and Methods," filed May 19, 2017.

\* cited by examiner

SYSTEMS AND METHODS FOR PREVENTING REMOTE ATTACKS AGAINST TRANSPORTATION SYSTEMS

CROSS-REFERENCE TO RELATED APPLICATIONS

This application claims the benefit of U.S. Provisional Application No. 62/338,665, entitled "Moving Target Defense Systems and Methods" and filed on May 19, 2016, which application is hereby incorporated by reference in its entirety.

BACKGROUND

The present application generally relates to system and methods for preventing attacks against a transportation system using the Internet for communications. Specifically, the present application is direct to preventing attacks against an aircraft avionics system and corresponding ground station by dynamically changing the IP (Internet Protocol) addresses used by both the aircraft avionics system and the ground station.

Computer technology is being used in many modern transportation systems for vehicles, trains and airplanes. The computer technology used with a transportation system can be susceptible to similar kinds of vulnerabilities and security problems found in networked computers. One type of transportation system can incorporate an aircraft avionics system that is used by many airplanes and/or aircraft to assist the pilot and other personnel with the operation of the aircraft.

Some aircraft avionics systems can be connected to the Internet via one or more satellites. The avionics systems can also include a Wi-Fi passenger network component as well as aircraft critical components such as control systems, flight safety systems and navigation systems. Since the aircraft uses a single avionics system, the critical components of the avionics system may be accessible through the passenger Wi-Fi network and/or via the Internet. Thus, an attacker may be able to obtain unauthorized access and control of the critical components (e.g., the navigation system) of the avionics system either remotely or from on-board the aircraft.

Some techniques used to prevent or limit attacks on an avionics systems can include isolating the critical components of the avionics system through the use of firewalls and intrusion detection and prevention systems, requiring pilot involvement before permitting changes to the critical components of the avionics system, and attempting to keep the design and technology of the avionics system secret. However, none of these techniques can prevent all attacks and some of the techniques may even be inoperable or problematic when the avionics system has to incorporate an uninterruptable autopilot system for emergency situations. An uninterruptable autopilot system, when engaged, is connected via satellite to air traffic control and one or more authorized remote entities and prevents anyone on-board the aircraft from controlling the aircraft. One drawback to the use of an uninterruptable autopilot system is the potential for an attacker to access and control the aircraft's avionics system and uninterruptable autopilot system.

SUMMARY

The present application generally pertains to moving target defense systems and methods for critical systems such as aircraft avionics systems and corresponding ground stations. The moving target defense systems and methods can randomly change the IP addresses used by both the aircraft avionics system and the ground station. The aircraft avionics system and the ground station can each be a "mobile" node that uses a "care-of" IP address for communications. The care-of address for each of the aircraft avionics system and the ground station can be changed at a predefined interval. The care-of address used for the aircraft avionics system or the ground station, which can be referred to as peer nodes, can be updated through a binding update process. During the binding update process, the one peer node sends the binding update notice (with a new care-of address) to the care-of address of the other peer node while maintaining its prior care-of address. The peer node that receives the binding update notice can send a binding acknowledgement back to the peer node that sent the binding update notice. Once the binding acknowledgement is received, the prior care-of address can be removed by the peer node that sent the binding update notice.

One advantage of the present application is the elimination of packet losses during IP address changes.

Another advantage of the present application is that the network protocol does not have to be modified.

Still another advantage of the present application is that attackers may have difficulty identifying the IP addresses of the aircraft avionics system and ground station.

Other features and advantages of the present application will be apparent from the following more detailed description of the identified embodiments, taken in conjunction with the accompanying drawings which show, by way of example, the principles of the application.

BRIEF DESCRIPTION OF THE DRAWINGS

Wherever possible, the same reference numbers are used throughout the drawings to refer to the same or like parts.

DETAILED DESCRIPTION

The present application generally pertains to systems and methods for preventing a remote attack against the nodes (or computers) of a transportation system that communicates using the Internet. The transportation system can include one or more vehicles (e.g., aircraft, trains, buses, etc.) incorporating computerized control systems (e.g., aircraft avionics systems, train control systems, etc.) that communicate with corresponding control centers or ground stations (e.g., an airport control tower, train dispatcher's office, etc.) via the Internet. The present application uses moving target defense techniques for the nodes (e.g., the vehicle computer systems and the control center computer systems) of the transportation system to provide the nodes with dynamically changing IP addresses. Thus, the source and destination addresses used in packets exchanged by the nodes can both be dynamic IP addresses.

The moving target defense system and methods can dynamically change the care-of address of the nodes (e.g., the vehicle computer systems and the control center computer systems), effectively making the nodes mobile nodes, even though a node may not actually be mobile. A predetermined shuffling interval can be used to determine when to change the care-of address. In addition, to avoid dropping packets when changing the care-of address of a node, the node changing addresses stores a copy of its prior address in memory and is able to receive packets addressed with the prior address while informing the other nodes of its new address. Once the node changing addresses has received acknowledgements from the other nodes indicating that the other nodes have received the new address, the node changing addresses can delete the prior address from memory and only receive packets addressed with the new address.

The present application is described in the context of an aircraft avionics system communicating with a ground station, but it is to be understood that the present application can be used in any transportation system that uses the Internet for communication between the nodes of the transportation system.

Figure 1:
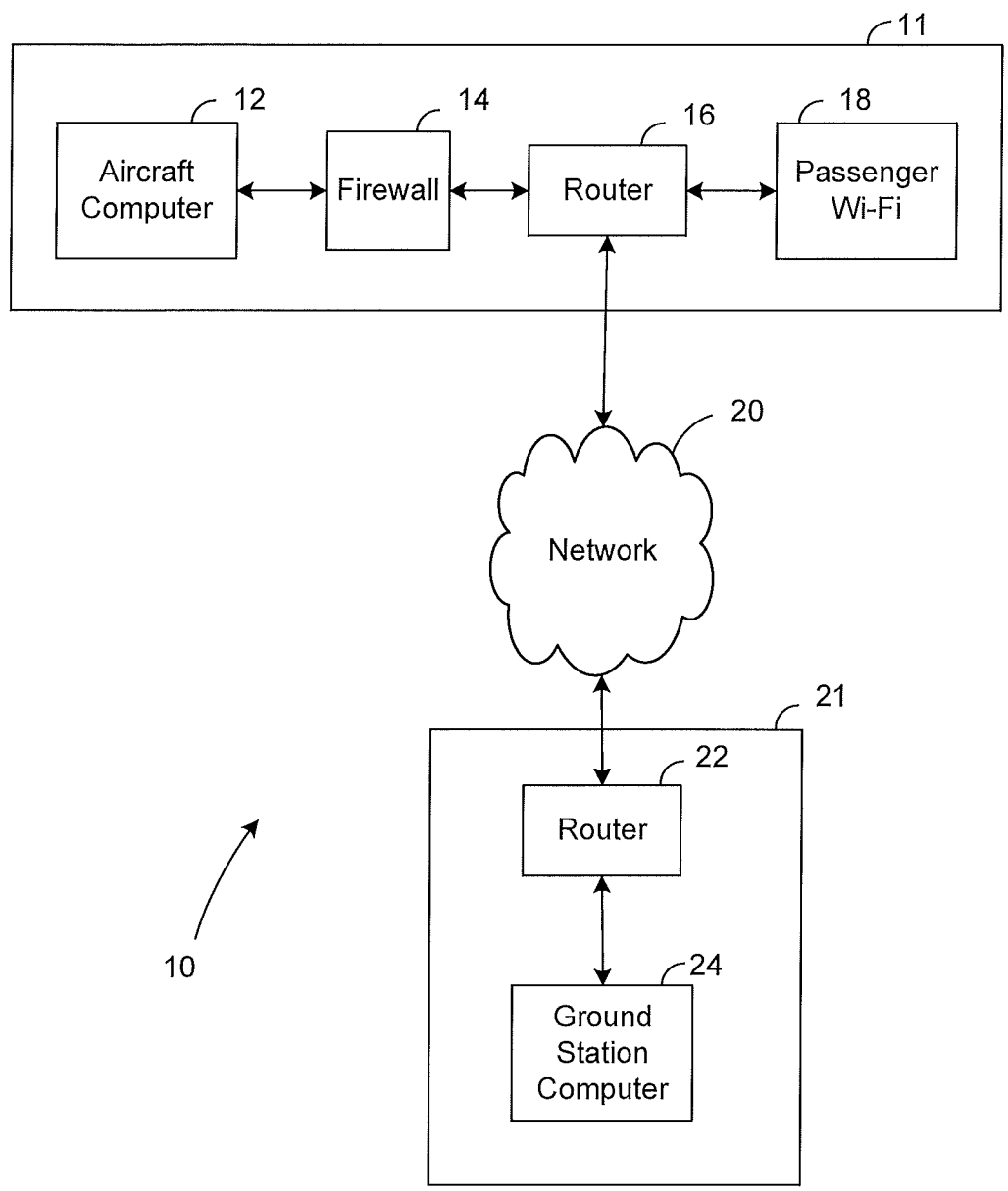
FIG. 1 shows a block diagram of an embodiment of a computer network.

FIG. 1 shows an embodiment of a computer network 10. The network 10 provides for communication between an aircraft 11 and a corresponding ground station 21 via network 20. An aircraft computer 12 of the aircraft 11 is communicatively coupled to the network 20 by a router 16 to exchange, i.e., send and receive, instructions, data and/or information with a ground station computer 24. The ground station computer 24 of the ground station 21 can be communicatively coupled to the network 20 by a router 22 to exchange, i.e., send and receive, instructions, data and/or information with the aircraft computer 12.

The aircraft computer 12 can be coupled to the router 16 by a firewall 14 and the router 16 can be coupled to network 20 to provide a communication path from the aircraft computer 12 to the network 20. The firewall 14 can be used to limit traffic to the aircraft computer 12. A passenger Wi-Fi network 18 can also be coupled to the router 16 and used to provide wireless broadband services to the passengers of the aircraft 11. The ground station computer 24 can be coupled to the router 22 and the router 22 can be coupled to the network 20 to provide a communication path from the ground station computer 24 to the network 20. In other embodiments, one or more of the aircraft computer 12 and the ground station computer 24 may be coupled directly to network 20 without using a router. In an embodiment, the network 20 can be the Internet and use the transmission control protocol/Internet protocol (TCP/IP) to communicate over the network 20. Due to the potentially large distances between the aircraft 11 and the ground station 21, the network 20 can incorporate one or more satellites (not shown) to facilitate communication between the aircraft 11 and the ground station 21 in some embodiments.

Figure 2:
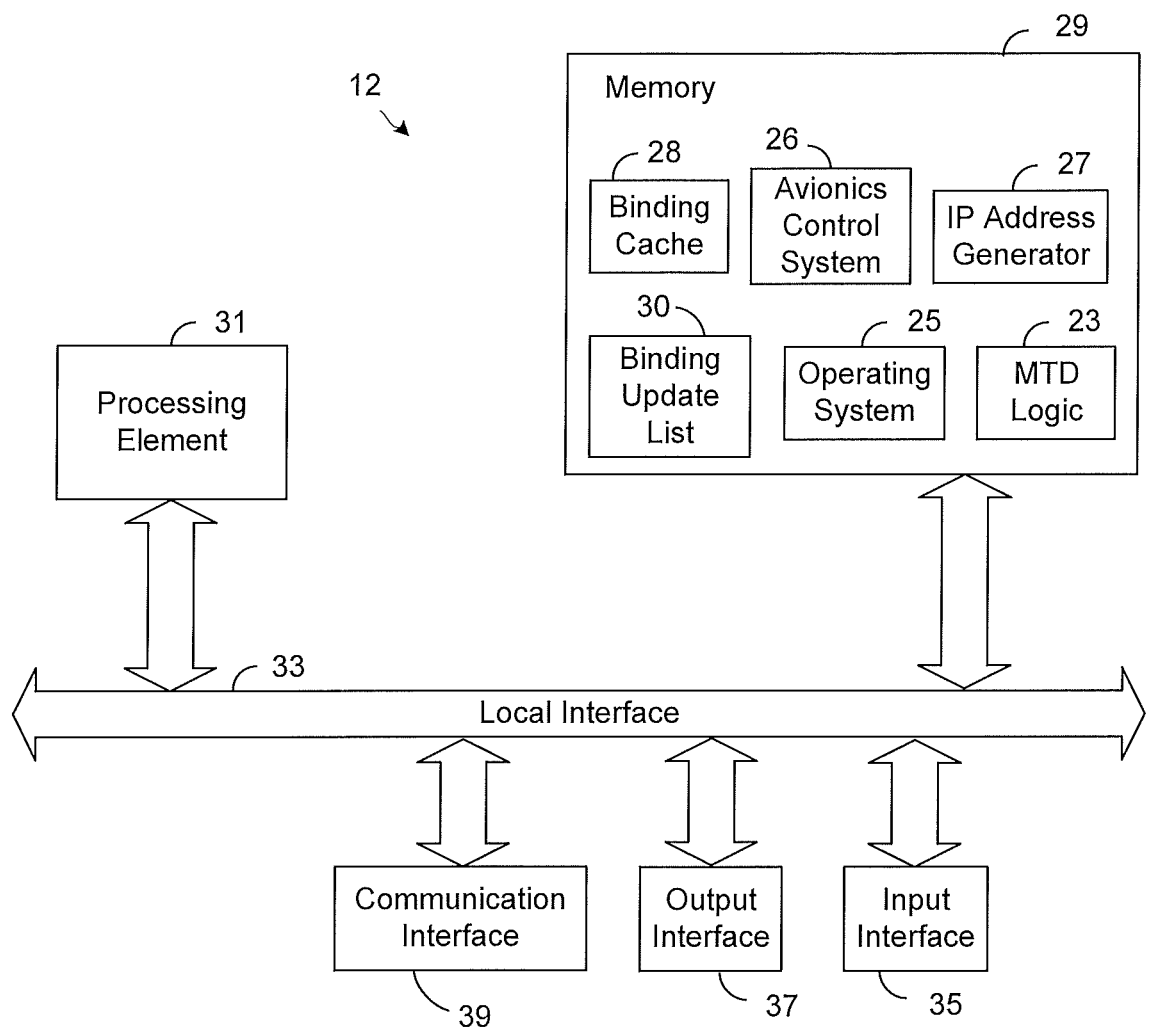
FIG. 2 shows a block diagram of an aircraft computer from the computer network of FIG. 1.

FIG. 2 depicts an embodiment of the aircraft computer 12. The aircraft computer 12 may include any device(s) capable of processing and communicating data, such as embedded computers (e.g., application specific standard processors (ASSPs), systems-on-chips (SoCs), or single board computers (SBCs)), real-time computers, programmable logic controllers (PLC) or Human Machine Interfaces (HMI) of Supervisory Control And Data Acquisition (SCADA) systems. The aircraft computer 12 has an operating system 25 for generally controlling the operation of the aircraft computer 12. The aircraft computer 12 also has MTD (moving target defense) logic 23 that operates in conjunction with the operating system 25 to control the IP (Internet protocol) addresses used by the aircraft computer 12 when communicating over network 20. The MTD logic 23 can use random IP addresses generated by the IP address generator 27. The aircraft computer 12 can have an avionics control system 26 that can be used to control operation of the aircraft 11 and can provide services such as flight control, navigation, collision detection and any other suitable operational control. The operating system 25, MTD logic 23, avionics control system 26 and IP address generator 27 can be implemented in software, hardware, firmware or any combination thereof. In the aircraft computer 12 shown by FIG. 2, the operating system 25, MTD logic 23, avionics control system 26 and IP address generator 27 can be implemented in software and stored in memory 29. Note that the operating system 25, MTD logic 23, avionics control system 26 and IP address generator 27, when implemented in software, can be stored and transported on any computer-readable medium for use by or in connection with an instruction execution apparatus that can fetch and execute instructions.

The aircraft computer 12 has at least one conventional processing element 31, which has processing hardware for executing instructions stored in memory 29. As an example, the processing element 31 may include a central processing unit (CPU) or a digital signal processor (DSP). The processing element 31 communicates to and drives the other elements within the aircraft computer 12 via a local interface 33, which can include at least one bus. Furthermore, an input interface 35, for example, a keypad, keyboard or a mouse, can be used to input data from a user of the aircraft computer 12, and an output interface 37, for example, a printer, monitor, liquid crystal display (LCD), or other display apparatus, can be used to output data to the user. Further, a communication interface 39, such as at least one modem, may be used to communicate with the router 16 (via firewall 14) and/or network 20.

The aircraft computer 12 can also include a binding cache 28 and a binding update list 30 stored in memory 29. The binding cache 28 can store binding information relating to nodes or computers that may receive packets from the aircraft computer 12. The binding update list 30 can store binding information relating to the binding updates sent by the aircraft computer 12. In one embodiment, the first entries in the binding cache 28 and the binding update list 30 can be set manually in the aircraft computer 12 in a system initialization step.

Figure 3:
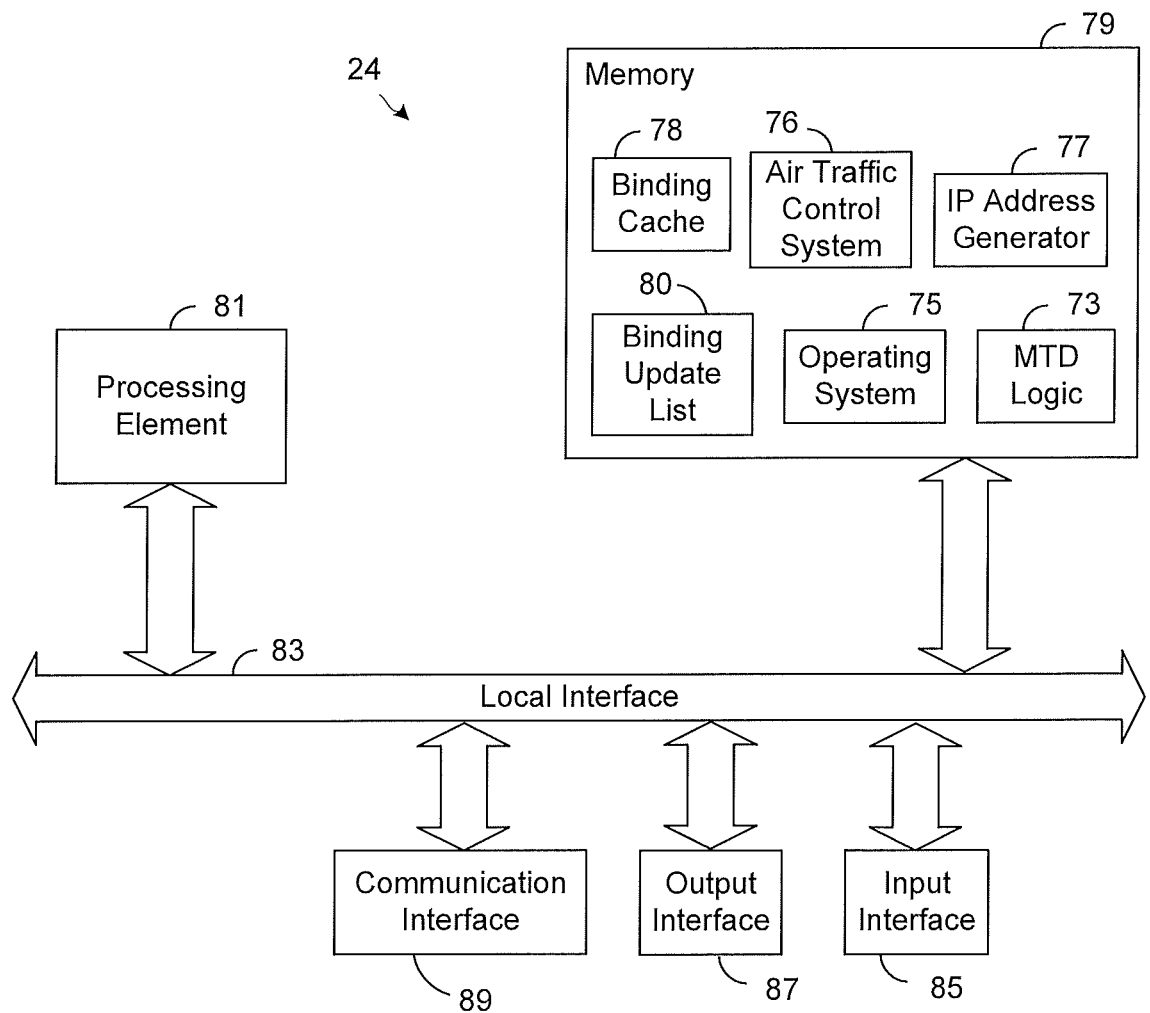
FIG. 3 shows a block diagram of a ground station computer from the computer network of FIG. 1.

FIG. 3 depicts an embodiment of the ground station computer 24. The ground station computer 24 may include any device(s) capable of processing and communicating data, such as embedded computers (e.g., application specific standard processors (ASSPs), systems-on-chips (SoCs), or single board computers (SBCs)), real-time computers, programmable logic controllers (PLC) or Human Machine Interfaces (HMI) of Supervisory Control And Data Acquisition (SCADA) system. The ground station computer 24 has an operating system 75 for generally controlling the operation of the ground station computer 24. The ground station computer 24 also has MTD (moving target defense) logic 73 that operates in conjunction with the operating system 75 to control the IP (Internet protocol) addresses used by the ground station computer 24 when communicating over network 20. The MTD logic 73 can use random IP addresses generated by the IP address generator 77. The ground station computer 24 has an air traffic control system 76 that can be used to control the flight paths of the aircraft 11 near the ground station 21. The operating system 75, MTD logic 73, air traffic control system 76 and IP address generator 77 can be implemented in software, hardware, firmware or any combination thereof. In the ground station computer 24 shown by FIG. 3, the operating system 75, MTD logic 73, air traffic control system 76 and IP address generator 77 can be implemented in software and stored in memory 79. Note that the operating system 75, MTD logic 73, air traffic control system 76 and IP address generator 77, when implemented in software, can be stored and transported on any computer-readable medium for use by or in connection with an instruction execution apparatus that can fetch and execute instructions.

The ground station computer 24 has at least one conventional processing element 81, which has processing hardware for executing instructions stored in memory 79. As an example, the processing element 81 may include a central processing unit (CPU) or a digital signal processor (DSP). The processing element 81 communicates to and drives the other elements within the ground station computer 24 via a local interface 83, which can include at least one bus. Furthermore, an input interface 85, for example, a keypad, keyboard or a mouse, can be used to input data from a user of the ground station computer 24, and an output interface 87, for example, a printer, monitor, liquid crystal display (LCD), or other display apparatus, can be used to output data to the user. Further, a communication interface 89, such as at least one modem, may be used to communicate with the router 22 and/or network 20.

The ground station computer 24 can also include a binding cache 78 and a binding update list 80 stored in memory 79. The binding cache 78 can store binding information relating to nodes or computers that may receive packets from the ground station computer 24. The binding update list 80 can store binding information relating to the binding updates sent by the ground station computer 24. In one embodiment, the first entries in the binding cache 78 and the binding update list 80 can be set manually in the ground station computer 24 in a system initialization step.

The MTD logic 23, 73 used in both the aircraft computer 12 and the ground station computer 24 can be used to prevent remote attacks against the aircraft computer 12 and the ground station computer 24 by providing dynamic IP addresses for the aircraft computer 12 and the ground station computer 24. In one embodiment, the MTD logic 23, 73 can be based on Mobile IPv6 (Internet Protocol version 6). The MTD logic 23, 73 uses home addresses of the aircraft computer 12 and the ground station computer 24 to be the permanent addresses of the aircraft computer 12 and the ground station computer 24. The MTD logic 23, 73 uses care-of addresses of the aircraft computer 12 and the ground station computer 24 to be the dynamic IP addresses provided to the peer computers (i.e., the other computers connected to the aircraft computer 12 or the ground station computer 24) via network 20. Additional information regarding the operation of the MTD logic 23,73 and IP address generators 27, 77 can be found in U.S. Provisional Application No. 62/338,665, entitled "Moving Target Defense Systems and Methods" and filed on May 19, 2016, which application is incorporated herein by reference in its entirety.

In one embodiment, the home addresses of the aircraft computer 12 and the ground station computer 24 can be assigned an IP address that is different from any possible care-of addresses that may be used by the aircraft computer 12 and the ground station computer 24. For example, the IP address of the home address for the aircraft computer 12 or the ground station computer 24 can have a prefix that is different from a subnet received by the aircraft computer 12 or the ground station computer 24 from a route advertisement message. By receiving a different prefix in the route advertisement message, the aircraft computer 12 or the ground station computer 24 can think it is in a foreign network and can register a care-of address in the network.

For example, the care-of address for the aircraft computer 12 may use a portion of the IP address for the router 16 connected to the aircraft computer 12 and the home address would be assigned an address such that the portion of the IP address for the router 16 used in the care-of address is not used for the home address. Similarly, the care-of address for the ground station computer 24 may use a portion of the IP address for the router 22 connected to the ground station computer 24 and the home address would be assigned an address such that the portion of the IP address for the router 22 used in the care-of address is not used for the home address.

Only the care-of address of the aircraft computer 12 is accessible by the ground station computer 24 (or other peer computers) and only the care-of address of the ground station computer 24 is accessible by the aircraft computer 12 (or other peer computers). The corresponding IP address generators 27, 77 can be used to dynamically rotate the care-of address of the aircraft computer 12 and the ground station computer 24 for the corresponding MTD logic 23, 73. The use of the home address as the permanent address for the aircraft computer 12 and the ground station computer 24 can provide transparency to applications operating on the aircraft computer 12 and the ground station computer 24. In addition, since the aircraft computer 12 and the ground station computer 24 can be connected to the network 18 via routers 16, 22, the home addresses are not accessible through the network 20. The only accessible IP addresses of the aircraft computer 12 and the ground station computer 24 are the care-of addresses which can be rotated randomly and dynamically.

The MTD logic 23, 73 (through Mobile IPv6) enables the peer computers to cache the binding of the aircraft computer's or the ground station computer's permanent IP address (the home address) with its dynamic IP address (the care-of address) and then send any packets destined for the aircraft computer 12 or the ground station computer 24 directly to the aircraft computer 12 or the ground station computer 24 using the dynamic IP address. A binding update mechanism/process can be used to inform the peer computers of changes to the dynamic IP address of the aircraft computer 12 or the ground station computer 24. The peer computers can use the new dynamic IP address from the aircraft computer 12 or the ground station computer 24 only after receiving the new address in a binding update message from the aircraft computer 12 or the ground station computer 24, which has registered the new dynamic IP address.

As part of the registration process discussed above, the aircraft computer 12 or the ground station computer 24 is connected to network 20 and the MTD logic 23, 73 with IP address generator 27, 77 can create a care-of address for the aircraft computer 12 or the ground station computer 24, based on information received in a route advertisement message from the router 16, 22 connected to the aircraft computer 12 or the ground station computer 24, using the stateless address auto configuration capability of IPv6. The MTD logic 23, 73 can then bind the care-of address for the aircraft computer 12 or the ground station computer 24 to the home address for the aircraft computer 12 or the ground station computer 24. Once the binding of the home address and the care-of address is complete, the aircraft computer 12 or the ground station computer 24 are not accessible by the home address. Thus, a new peer computer connecting to network 20 cannot have access to the aircraft computer 12 or the ground station computer 24 by the home address of the aircraft computer 12 or the ground station computer 24.

The MTD logic 23, 73 can then start the route optimization process by sending a packet from the aircraft computer 12 or the ground station computer 24 to each other peer computer using a static shared key method. The aircraft computer 12 or the ground station computer 24 can send a binding update message to each peer computer and wait to receive a corresponding binding acknowledgement message from each peer computer. In one embodiment, the MTD logic 23, 73 can use static shared key during the binding update procedure. In another embodiment, the MTD logic 23, 73 can use Internet Protocol Security (IPsec) with Internet Key Exchange (IKE) during the binding update procedure. Both security methods may also be used for transmitting data packets between the aircraft computer 12 and ground station computer 24.

The binding update list 30, 80 of the aircraft computer 12 or the ground station computer 24 stores information for each binding update sent by the aircraft computer 12 or the ground station computer 24. The binding update list 30, 80 includes all bindings sent by the aircraft computer 12 or the ground station computer 24 either to its home agent (e.g., router 16, 22) or peer computers. For multiple binding updates sent to the same destination address, the binding update list 30, 80 can include only the most recent binding update sent to that destination address. The binding update list 30,80 can be used to determine whether a particular packet is sent directly to the peer computer or tunneled via the home agent. Each entry in the binding update list 30, 80 can include fields for: the IP address of the node to which a binding update was sent; the home address of the aircraft computer 12 or the ground station computer 24 sending the binding update; and the care-of address sent in that binding update.

The binding cache 28, 78 of the aircraft computer 12 or the ground station computer 24 records information relating to the bindings of other nodes or peer computers. Each entry in the binding cache 28, 78 can include fields for: the home address of the peer computer providing the binding information to be entered into the binding cache; and the care-of address for the peer computer indicated by the home address field in the binding cache entry. The home address field in the binding cache entry is used as the key for searching the binding cache for the destination address of a packet being sent. Each time the aircraft computer 12 or the ground station computer 24 executes a change of its care-of address, the aircraft computer 12 or the ground station computer 24 can send binding update messages to all of the peer computers listed in the binding update list 30, 80.

Figure 4:
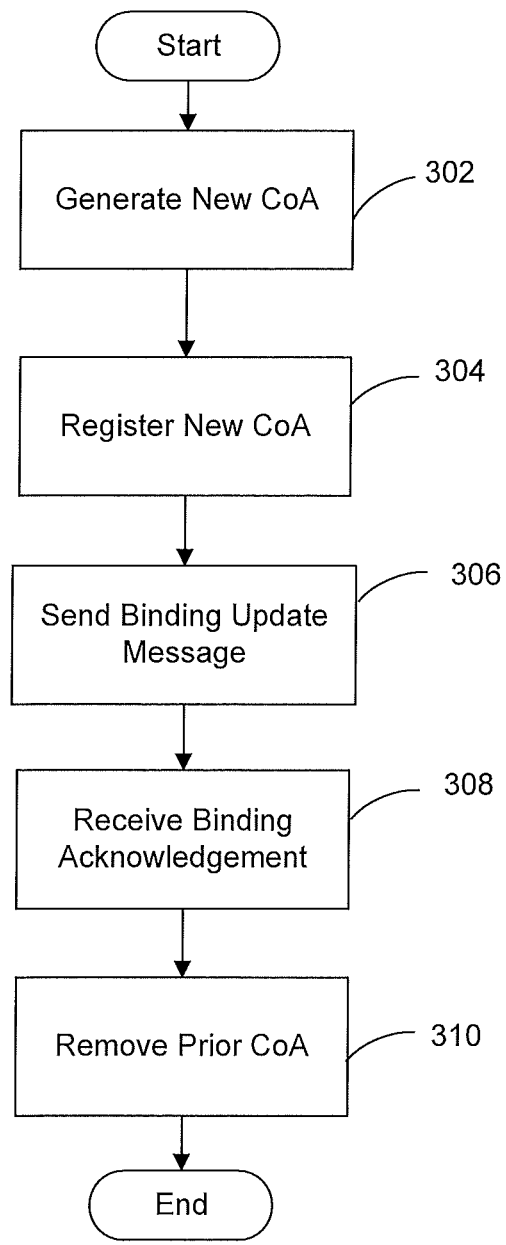
FIG. 4 is a process diagram showing an embodiment for changing the IP address of the aircraft computer or the ground station computer from the computer network of FIG. 1.

FIG. 4 shows an embodiment of a process for updating the care-of address of the aircraft computer 12 or the ground station computer 24. The process begins by generating a new CoA (care-of address) by the corresponding IP address generator 27, 77 (step 302). The IP address generator 27, 77 can randomly generate a new IP address as the CoA of the aircraft computer 12 or the ground station computer 24. The IP address generator 27, 77 can create a random 64 bit address and combine the randomly created address with the highest significant 64 bits of the current CoA to generate the new CoA. In other embodiments, the random portion of the new CoA and the highest significant bits portion of the new CoA can be of different bit lengths depending on the size of the CoA and the desired amount randomness to be incorporated into the new CoA. The new CoA is then checked to determine if it is unoccupied, i.e., available, by sending a neighbor solicitation message before registering the new CoA. The MTD logic 23, 73 can then detect if an address collision occurred, i.e., the new CoA is being used by another device. If an address collision occurred, the process generates another CoA and checks to see if it is unoccupied.

If no collision is detected, then the new CoA can be registered (step 304). When the new CoA is registered the prior CoA can be maintained in memory in order for the aircraft computer 12 or the ground station computer 24 to receive messages from peer computers during the update process. The MTD logic 23, 73 can then send a binding update message (step 306) to the peer computers connected to the aircraft computer 12 or the ground station computer 24 to inform the peer computers of the new CoA. In one embodiment, the aircraft computer 12 or the ground station computer 24 can check its binding cache 28, 78 before sending the binding update message in order to send the binding update message directly to the CoAs of the peer computers (i.e., the destination address is the CoA of the peer computer) without having to use any home agents.

In one embodiment, IPsec should be used for encryption and as a proof of home address ownership when sending a binding update message. The peer computer receiving a binding update message protected by IPsec has proof of home address ownership by the aircraft computer 12 or the ground station computer 24. When IPsec is used to communicate packets between two peer computers, every packet can contain a simple piece of information (e.g., a security parameter index) that gives access to address information for both peers and the shared key. IPsec can be used for the route optimization process such that there is not a need for any home agent in the network and the home addresses are not accessible.

The aircraft computer 12 or the ground station computer 24 can receive a binding acknowledgement message from each of the peer computers (step 308) notifying the aircraft computer 12 or the ground station computer 24 that the peer computers have been informed of the new CoA. Once the aircraft computer 12 or the ground station computer 24 has received binding acknowledgements from the peer computers, the aircraft computer 12 or the ground station computer 24 can remove the prior CoA from memory (step 310).

In one embodiment, the process of FIG. 4 can be repeated on a predetermined interval, which can be referred to as a shuffling interval. The shuffling interval can range from shorter time periods such as 5 or 10 seconds (down to about 2 seconds) to longer time periods such as 1 or 2 minutes (or greater) depending on the activity at the aircraft computer 12 or the ground station computer 24. During the update procedure, the aircraft computer 12 or the ground station computer 24 can be accessed by the peer computers since the aircraft computer 12 or the ground station computer 24 maintains the prior CoA during the update procedure.

Figure 5:
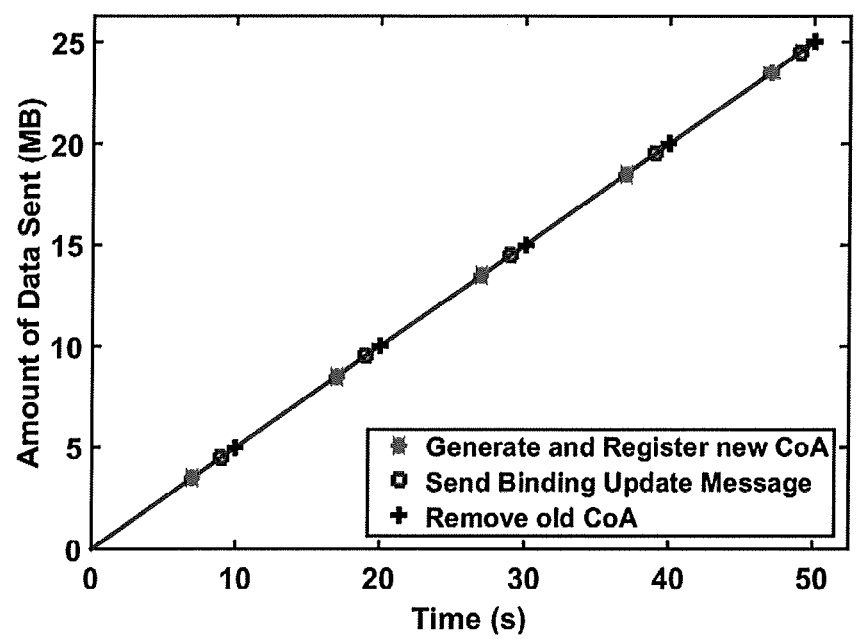
FIG. 5 is a graph showing the amount of data sent versus time during executions of the process of FIG. 4.

In one example, the aircraft computer 12 can send 1000 TCP packets per second (each packet being 500 B (bytes)) to the ground station computer 24 over a 50 second time period. The shuffling interval used by the aircraft computer 12 can be 10 seconds. The signaling overhead at a node, per update, can be 268 B to about 316 B (from the binding update message and the binding acknowledgement message). The data signaling packet overhead can be 24 B (from the IPsec header). As shown in FIG. 5, there is no packet loss in the transmissions over the 50 second time period. In addition, FIG. 5 also shows the shuffling interval transitions from the process of FIG. 4.

In an embodiment, the new CoA should be created and announced by a binding update message before removing the previous CoA. The old CoA can be removed after receiving the binding acknowledgement message(s) from the peer computers. The aircraft computer 12 or the ground station computer 24 should generate a new CoA and make sure that the IP address for the new CoA is free (e.g., by neighbor solicitation message). Then the aircraft computer 12 or the ground station computer 24 should send a ping from the new CoA to its router 16, 22 to put the new CoA (with the MAC address) in the router's table, Then the aircraft computer 12 or the ground station computer 24 should send the binding update message to the peer computers and after receiving the binding acknowledgement messages from the peer computers, the aircraft computer 12 or the ground station computer 24 can remove the previous CoA.

Although the figures herein may show a specific order of method steps, the order of the steps may differ from what is depicted. Also, two or more steps may be performed concurrently or with partial concurrence. Variations in step performance can depend on the software and hardware systems chosen and on designer choice. All such variations are within the scope of the application. Software implementations could be accomplished with standard programming techniques, with rule based logic and other logic to accomplish the various connection steps, processing steps, comparison steps and decision steps.

It should be understood that the identified embodiments are offered by way of example only. Other substitutions, modifications, changes and omissions may be made in the design, operating conditions and arrangement of the embodiments without departing from the scope of the present application. Accordingly, the present application is not limited to a particular embodiment, but extends to various modifications that nevertheless fall within the scope of the application. It should also be understood that the phraseology and terminology employed herein is for the purpose of description only and should not be regarded as limiting.

What is claimed is:

1. A method for dynamically updating a care-of address for a first mobile node, the method comprising:
   generating a new care-of address for a first mobile node, the new care-of address for replacing a prior care-of address for the first mobile node, wherein the new care-of address has a first portion that is based on the prior care-of address and a second portion that is randomly generated, and wherein the first portion of the new care-of address is identical to a first portion of the prior care-of address;
   sending a binding update message with the new care-of address to a second mobile node;
   receiving, by the first mobile node, a binding acknowledgement from the second mobile node indicating that the second mobile node has received the new care-of address from the first mobile node;
   accepting, by the first mobile node, packets from the second mobile node using the new care-of address upon receipt of the binding acknowledgement by the first mobile node; and
   rejecting, by the first mobile node, packets from the second mobile node using the prior care-of address upon receipt of the binding acknowledgement by the first mobile node.

2. The method of claim 1, further comprising accepting, by the first mobile node, packets from the second mobile node using the prior care-of address after sending the binding update message to the second mobile node.

3. The method of claim 1, further comprising storing, by the first mobile node, the prior care-of address in memory in response to the generation of the new care-of address.

4. The method of claim 1, wherein the sending the binding update message includes:
   searching a binding cache, by the first mobile node, for a care-of address used by the second mobile node; and
   inserting the care-of address used by the second mobile node as a destination address of the binding update message.

5. The method of claim 1, further comprising storing, by the first mobile node, information relating to the sending the binding update message to the second mobile node in a binding update list.

6. The method of claim 1, wherein both the new care-of address and the prior care-of address are different from a home address of the first mobile node.

7. The method of claim 1, further comprising:
   generating a new care-of address for the second mobile node, the new care-of address for the second mobile node replacing a prior care-of address for the second mobile node;
   sending a binding update message with the new care-of address for the second mobile node to the first mobile node;
   receiving, by the second mobile node, a binding acknowledgement from the first mobile node indicating that the first mobile node has received the new care-of address for the second mobile node;
   accepting, by the second mobile node, packets from the first mobile node using the new care-of address for the second mobile node upon receipt of the binding acknowledgement by the second mobile node; and
   rejecting, by the second mobile node, packets from the first mobile node using the prior care-of address for the second mobile node upon receipt of the binding acknowledgement by the second mobile node.

8. The method of claim 7, wherein the new care-of address for the second mobile node has a first portion that is identical to a first portion of the prior care-of address for the second mobile node and a second portion that is randomly generated.

9. A method for dynamically updating a care-of address for a first mobile node, the method comprising:
   generating a new care-of address for a first mobile node, the new care-of address for replacing a prior care-of address for the first mobile node;
   storing, by the first mobile node, the prior care-of address in memory in response to the generation of the new care-of address;
   sending a binding update message with the new care-of address to a second mobile node;
   receiving, by the first mobile node, a binding acknowledgement from the second mobile node indicating that the second mobile node has received the new care-of address from the first mobile node;
   accepting, by the first mobile node, packets from the second mobile node using the new care-of address upon receipt of the binding acknowledgement by the first mobile node;
   deleting, by the first mobile node, the prior care-of address from the memory in response to the receipt of the binding acknowledgement; and
   rejecting, by the first mobile node, packets from the second mobile node using the prior care-of address upon receipt of the binding acknowledgement by the first mobile node.

10. A method for dynamically updating a care-of address for a first mobile node, the method comprising:
- generating a new care-of address for a first mobile node, the new care-of address for replacing a prior care-of address for the first mobile node;
- sending a binding update message with the new care-of address to a second mobile node;
- receiving, by the first mobile node, a binding acknowledgement from the second mobile node indicating that the second mobile node has received the new care-of address from the first mobile node;
- accepting, by the first mobile node, packets from the second mobile node using the new care-of address upon receipt of the binding acknowledgement by the first mobile node;
- rejecting, by the first mobile node, packets from the second mobile node using the prior care-of address upon receipt of the binding acknowledgement by the first mobile node; and
- repeating, by the first mobile node, the generating the new care-of address and the sending the binding update message at a predefined interval.

11. A transportation system comprising:
- a first node corresponding to a first component of a transportation system;
- a second node coupled to the first node by a network, the second node corresponding to a second component of the transportation system;
- the first node having a first node home address and a first node care-of address, the first node configured to change the first node care-of address at a first predefined interval;
- the second node having a second node home address and a second node care-of address, the second node configured to change the second node care-of address at a second predefined interval; and
- wherein the first node is configured to use the second node care-of address when addressing packets to the second node and the second node is configured to use the first node care-of address when addressing packets to the first node.

12. The transportation system of claim 11, wherein the first node corresponds to an aircraft avionics system and the second node corresponds to a ground station.

13. The transportation system of claim 11, wherein the first node is configured to execute a binding update process when changing the first node care-of address from a prior first node care-of address to a new first node care-of address, the new first node care-of address and the prior first node care-of address are different from the first node home address, the first node configured to receive packets using the prior first node care-of address from the second node during the binding update process.

14. The transportation system of claim 13, wherein the first node is configured to send a first node binding update message to the second node during the binding update process, and the second node is configured to send a first node binding acknowledgement to the first node in response to receiving the first node binding update message.

15. The transportation system of claim 14, wherein the first node is configured to end the binding update process in response to receiving the first node binding acknowledgement from the second node.

16. The transportation system of claim 13, wherein the second node is configured to execute a binding update process when changing the second node care-of address from a prior second node care-of address to a new second node care-of address, the new second node care-of address and the prior second node care-of address are different from the second node home address, the second node configured to receive packets using the prior second node care-of address from the first node during the binding update process.

17. The transportation system of claim 16, wherein the second node is configured to send a second node binding update message to the first node during the binding update process, and the first node is configured to send a second node binding acknowledgement to the second node in response to receiving the second node binding update message.

18. The transportation system of claim 17, wherein the second node is configured to end the binding update process in response to receiving the second node binding acknowledgement from the first node.

19. The transportation system of claim 11, wherein:
- the first node comprises a first binding cache storing the second node care-of address, the first node configured to retrieve the second node care-of address in the first binding cache when sending a packet to the second node; and
- the second node comprises a second binding cache storing the first node care-of address, the second node configured to retrieve the first node care-of address in the second binding cache when sending a packet to the first node.

* * * * *